United States Patent
Szeteli et al.

(10) Patent No.: US 6,270,055 B1
(45) Date of Patent: Aug. 7, 2001

(54) HYDRAULIC SHUT-OFF VALVE

(75) Inventors: Andreas Szeteli, Filderstadt; Werner Büttner, Darmstadt; Martin Benzinger, Michelstadt, all of (DE)

(73) Assignee: Merck Patent Gesellschaft mit beschrankter Haftung (DE)

(*) Notice: Subject to any disclaimer, the term of this patent is extended or adjusted under 35 U.S.C. 154(b) by 0 days.

(21) Appl. No.: 09/559,658

(22) Filed: Apr. 28, 2000

Related U.S. Application Data

(63) Continuation of application No. 08/545,793, filed as application No. PCT/EP95/00778 on Mar. 3, 1995.

(30) Foreign Application Priority Data

Mar. 10, 1994 (DE) ................................. 44 07 976

(51) Int. Cl.[7] ................................. F16K 31/02
(52) U.S. Cl. .................... 251/335.3; 137/15.19; 137/15.24; 137/614.04

(58) Field of Search .............. 137/614.03, 15.18, 137/15.19, 15.24; 251/335.3, 368

(56) References Cited

U.S. PATENT DOCUMENTS

| | | | |
|---|---|---|---|
| 3,528,087 | 9/1970 | Perkins | 251/335.3 |
| 4,583,710 | 4/1986 | Adams et al. | 251/335.3 |
| 4,733,692 | 3/1988 | Kotake et al. | 251/335.3 |
| 5,000,215 | 3/1991 | Phillips | 251/335.3 |
| 5,122,123 | 6/1992 | Valliancourt | 604/192 |

FOREIGN PATENT DOCUMENTS

| | | |
|---|---|---|
| 0 344 582 | 12/1989 | (EP) . |
| 09311828 | 6/1993 | (WO) . |

*Primary Examiner*—A. Michael Chambers
(74) *Attorney, Agent, or Firm*—Millen, White, Zelano & Branigan, P.C.

(57) ABSTRACT

In a hose coupling with a coupling sleeve and a coupling nipple and a valve insert (9) provided therein, the valve spring, the holding element and the valve seat of the valve insert are designed as a one-piece component, and the valve spring (11) has a cavity (21) which is closeable.

12 Claims, 3 Drawing Sheets

HYDRAULIC SHUT-OFF VALVE

This application is a con't of Ser. No. 08/545,793 filed Nov. 9, 1995, which is a 371 of PCT/EP95/00778 filed Mar. 3, 1995.

DESCRIPTION

The invention relates to a hydraulic shut-off valve with a valve insert which has a valve spring, a holding element and a valve seat, and the valve spring, the holding element and the valve seat are designed as a two-piece or one-piece component, the valve spring being designed as a body which has a cavity.

Hydraulic shut-off valves of this kind are known in hose couplings which are of the type which shut off on both sides and act as quick-closing couplings. In these known couplings, the connection is established by pushing the coupling sleeve onto the coupling nipple, during which process the coupling sleeve latches with the coupling nipple by way, for example, of a ball catch. When the sleeve is pushed onto the nipple, the two valve inserts are raised from their sealing surfaces and establish the connection between the two hose ends. The valve inserts of these known hose couplings consist of a plurality of individual parts which are generally plugged into one another. Here, the holding element acts as a fastening element for the complete valve insert in the coupling nipple or in the coupling sleeve.

The valve seat is designed as a further, separate component and serves at the same time as a carrier for the valve spring and the holding element. In another known exemplary embodiment, the valve spring is designed as a corrugated hose and its ends are held in the holding element of sleeve-shaped design and the valve seat of sleeve-shaped design, respectively. It has been found here that the depressions in the wall of the corrugated hose, the ends of which are held in the sleeve-shaped holding element and in the sleeve-shaped valve seat, form dead spaces and, as a result, dirt-collecting gaps which may have a disadvantageous effect on the medium to be carried in the hose lines. Moreover, when using high-purity chemicals as the medium to be transported, no metal parts must come into contact with the chemicals since, otherwise, the chemicals will be contaminated by metal ions. If such contaminated chemicals were used for the production of electronic components, this would give rise to problems since the metal ions are released to the electronic components and thereby contaminate these components.

DE 30 50 957 C2 and DE 36 18 233 C2 disclose shut-off valves in which the valves springs of the valve insert are in the form of a bellows. It has been found here that the bellows succumbs gradually to fatigue and is therefore suitable only to a limited extent as a spring since the restoring force gradually weakens. In addition, the bellows has only a low spring constant.

On the basis of DE 30 50 957 C2, the object on which the invention is based is to further develop a hydraulic shut-off valve of the type stated at the outset in such a way that the valve insert raises fewer problems, particularly in the area of high-purity chemicals.

According to the invention, this object is achieved by virtue of the fact that the cavity is closed in gas-tight fashion by means of a screw plug or by means of a cover which is welded on or welded in.

The valve insert according to the invention has the advantage that it has a higher spring constant and can be produced with smaller tolerances. Moreover, no dead spaces arise.

The gas-tight closure of the cavity provides the advantage that, when the spring is compressed, the enclosed gas volume in the cavity is likewise compressed and produces a restoring force in the direction of the spring force. This restoring force stemming from the enclosed gas volume counteracts slackening of the spring, and the spring constant of the valve insert according to the invention or of its valve spring is thus constant over a long period. In addition, the gas volume enclosed in the cavity raises the spring constant, making it possible to use as the spring material even materials which have a low modulus of elasticity.

According to the invention, the valve insert is provided in a coupling sleeve and a coupling nipple of a hose coupling. Here too, the installation of the valve insert in the sleeve and the nipple is considerably simplified.

To assist the spring force of the valve insert and of the compressed gas volume, a further element composed of a suitable material, preferably however of plastic, can be additionally inserted in the cavity of the valve insert. If the auxiliary spring installed in the cavity of the valve insert has a spiral shape, it must be coiled counter to the direction of screwing in of the valve insert. This prevents loosening of the valve seat in the valve housing due to the actuation of the coupling.

In conventional coupling designs, it is generally assumed that the spring characteristics of the spring elements are approximately the same in both parts of the coupling, namely the coupling sleeve and the coupling nipple, and also do not change or at least change in the same manner during the period of use. This is the pre-requisite for the ability to open the valves of the two parts of the coupling in an optimum manner when the said parts are brought together. If the spring characteristics are different, due, for example, to premature fatigue of one of the two spring elements, there is the risk that one valve will be opened only incompletely or not at all. As a result, the rate of flow in the coupling system will be restricted to a greater or lesser degree or passage will be completely interrupted.

In the present invention, the possibility of such faults can be eliminated by the additional installation of a distance pin in the valve seat. The distance pin can either be inserted loosely into the housing or be connected to the outer housing in a fixed manner.

According to a preferred embodiment, the valve spring is formed by a bellows or a corrugated hose. Here, the bellows has an undulating wall. In another exemplary embodiment, the bellows has a zig-zag wall. By virtue of the configuration of the wall as an undulating wall or in a zig-zag shape, the spring constant can be influenced in a specific manner, undulating walls being used for a high spring constant and zig-zag walls for lower spring constants. The spring constant can be further increased by a shallow undulation or zig-zag.

In another exemplary embodiment, the valve spring is formed by a coiled spring.

According to the invention, the valve insert is produced by machining or by injection-moulding. In this case, the valve seat has an actuating nose for the other valve insert on its side remote from the valve spring. As the coupling nipple is coupled to the coupling sleeve, this actuating nose rests on the valve seat of the other valve insert and raises it from the sealing surface as the coupling nipple is pushed further into the coupling sleeve. At the same time, however, the valve seat together with the actuating nose also rises from the sealing surface, with the result that the two hose ends are then connected to one another and the medium to be transported can pass through the two valves unhindered. The opening gap can be set to a specific size by means of the length of the actuating nose.

According to a preferred exemplary embodiment, the valve insert is composed of plastic, especially a fluoroplastic such as PFA, PTFE, TFM, PEEK etc. Such plastics are used particularly when high-purity chemicals have to be transported. If the valve spring has a gas-tight cavity, such plastics can be used without reservations since the spring constant of such plastics is raised to such an extent by the enclosed gas volume and, furthermore, the plastic shows no signs of fatigue due to the restoring force provided by the enclosed gas volume that the properties are comparable to those of metal springs.

The valve insert according to the invention of a hydraulic shut-off valve are preferably used in hose couplings for the connection of hose lines in which high-purity chemicals are transported. The novel valve insert proves to be particularly advantageous particularly where this is the intended use since its properties correspond to those of a valve insert with a metal spring but the risks which arise with the use of metal components are avoided. In the event of a defect, for example breakage of the valve insert according to the invention, no contamination of the high-purity chemical by, for example, metal ions is to be expected, something which would be the case with the use of metal springs, which are generally [lacuna] by a plastic hose which is welded tight at both ends. The hose coupling according to the invention can thus be used without reservations in the production of electronic components, e.g. microchips or the like.

The spring constant, in particular the spring characteristic, can furthermore be influenced in a specific manner by the insertion of a further spring element into the cavity of the valve spring. In this way, the spring characteristic can, for example, be adjusted linearly, degressively or progressively or varied in such a way that it has a kink.

Further advantages, features and details emerge from the following description, in which a specially preferred exemplary embodiment is described in detail with reference to the drawing, in which.

Figure 1:
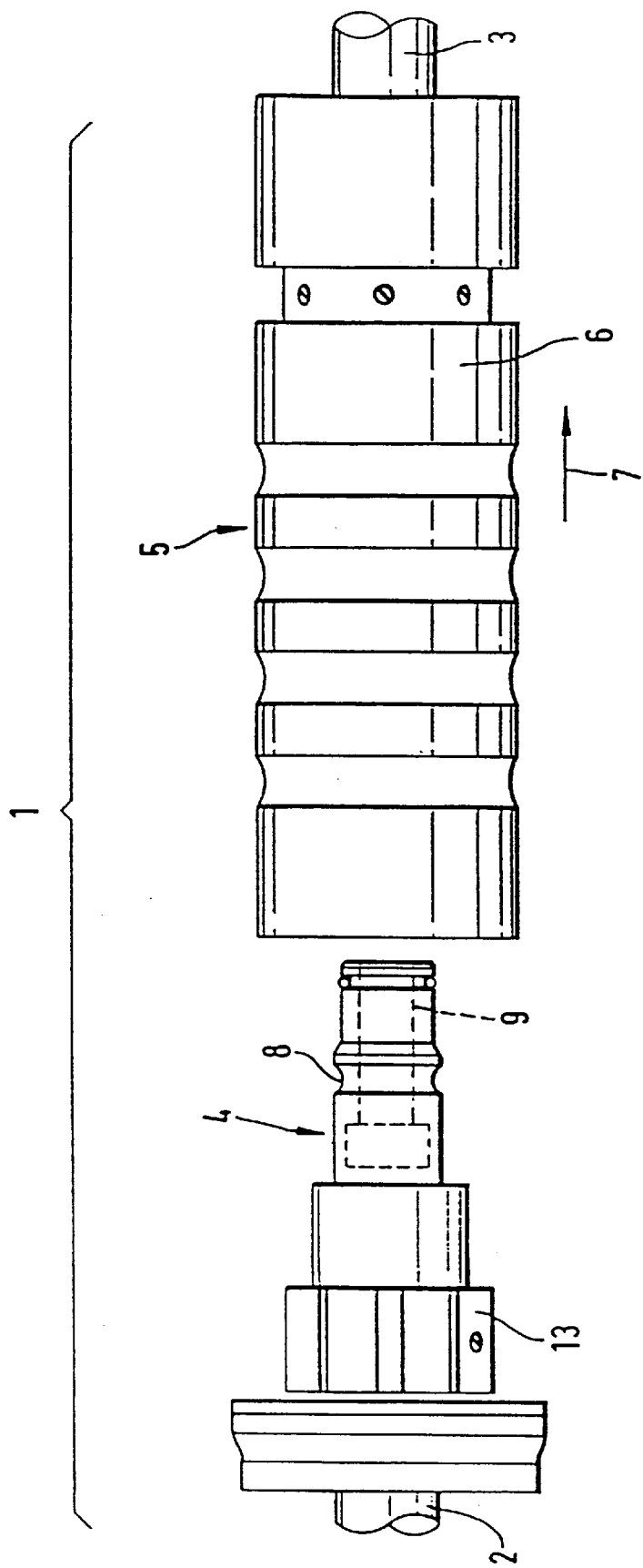
FIG. 1 shows a side view of a hose coupling with a coupling sleeve and a coupling nipple and a valve insert shown in an indicative manner.

FIG. 1 shows a hose coupling 1 by means of which two ends 2 and 3 of two hose lines carrying fluid media can be connected to one another. The hose coupling 1 consists of a coupling nipple 4 and a coupling sleeve 5 which has a displaceably mounted sliding sleeve 6. Before the coupling nipple 4 is pushed into the coupling sleeve 5, the sliding sleeve 6 must be displaced in the direction of the arrow 7, whereby a ball catch (not shown) situated inside the sliding sleeve 6 is opened. The coupling nipple 4 can then be pushed into the coupling sleeve 5 and the sliding sleeve 6 is displaced counter to the direction of the arrow 7. During this process, the ball catch engages in the circumferential groove 8 provided for this purpose on the coupling nipple 4 and holds the latter securely in the coupling sleeve 5. A valve insert 9 which closes the coupling nipple 4 tightly when the hose coupling 1 is open is shown schematically (in broken lines) in the coupling nipple 4. A valve insert of this kind is also provided in the coupling sleeve 5 and this coupling sleeve is thus also tightly closed when the hose coupling 1 is open. As the hose coupling 1 is engaged, the two valve inserts open so that the ends 2 and 3 of the hose lines are connected to one another and the fluid to be transported can pass through the hose coupling 1.

Figure 2:
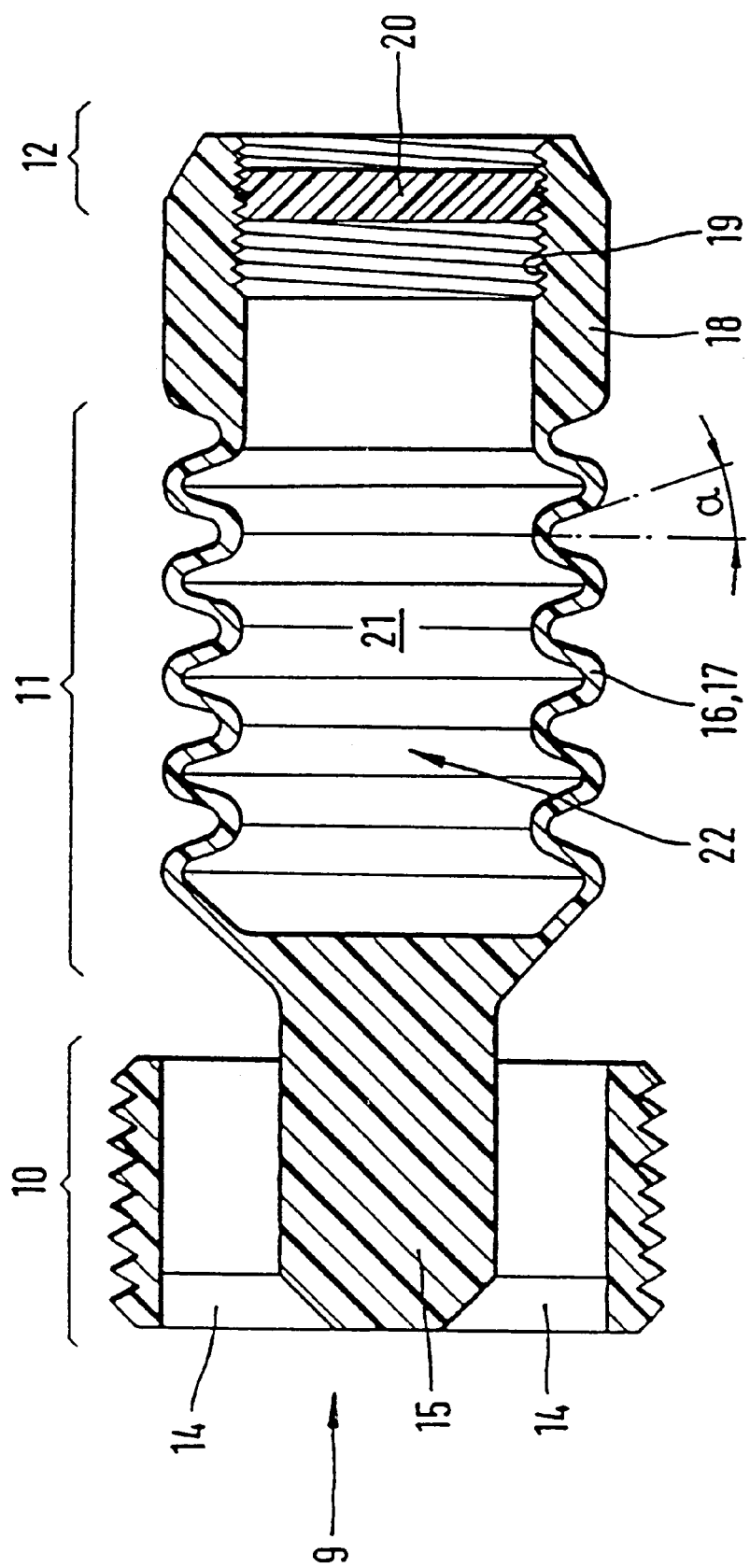
FIG. 2 shows a first embodiment of a valve insert in longitudinal section and in enlarged representation.

FIG. 2 shows a first exemplary embodiment of the valve insert 9, which is designed as a one-piece component. The valve insert 9 has a holding element 10, a valve spring 11 and a valve seat 12. The respective valve insert 9 is fixed in the coupling nipple 4 and in the coupling sleeve 5 by means of the holding element 10, which is secured in the nipple 4 and in the sleeve 5, respectively, being, in particular, screwed in. The screw-in direction is in each case from the end of the hose 2 or 3 in the direction of opening of the coupling. To screw in the valve insert 9, the coupling nipple 4 can, for example, be removed by means of a union nut 13, making it accessible from the rear. The coupling sleeve 5 can be removed in a corresponding manner or disassembled to insert or remove the valve insert 9.

A spring carrier 15 is provided coaxially on the holding element 10 via two webs 14, this spring carrier merging into the valve spring 11. This valve spring 11 is designed as a bellows 16 and has an undulating wall 17. Instead of an undulation, the wall 17 can also be of zig-zag or rectangular design. The spring constant can be varied by means of the slope, here represented by the angle $\alpha$, of the individual wall sections. However, it can also be varied by means of the wall thickness, the length of the valve spring 11, the radius of curvature of the undulation etc.

Adjoining the valve spring 11 is a sleeve-shaped extension 18 which bears the valve seat 12. In the exemplary embodiment illustrated, this valve seat 12 is of conical configuration, but it can also be provided with a seal. The extension 18 has an internal thread 19 into which a screw plug 20 is screwed in gas-tight fashion. Instead of the screwed joint between the extension 18 and the screw plug 20, it is also possible for a disc to be bonded in, welded in or welded on. In this way, a body 22 with a cavity 21 is formed and the body can be compressed by virtue of the valve spring 11. During this process, the volume of the cavity 21 is reduced and the gas contained in it is compressed. The energy stored in this way produces a restoring force in the direction of the spring force of the valve spring 11, i.e. in the closing direction of the valve insert 9. By virtue of this restoring force, fatigue or slackening of the valve spring 11 is counteracted and the said spring thus has a virtually uniform spring constant over a long period.

If required, the cavity 21 can be filled with a further spring element, e.g. a helical spring or the like, thereby influencing the spring characteristic of the valve insert 9 in a specific manner. This spring which is inserted into the cavity 21 can be composed of metal but plastic is preferred. The valve insert 9 itself is composed of plastic, particularly a fluoroplastic.

If a defect in the valve insert 9 should occur during the operation of the hose coupling 1, there is no danger that the fluid to be transported will be contaminated by metal ions since the valve insert 9 is composed of plastic.

Figure 3:
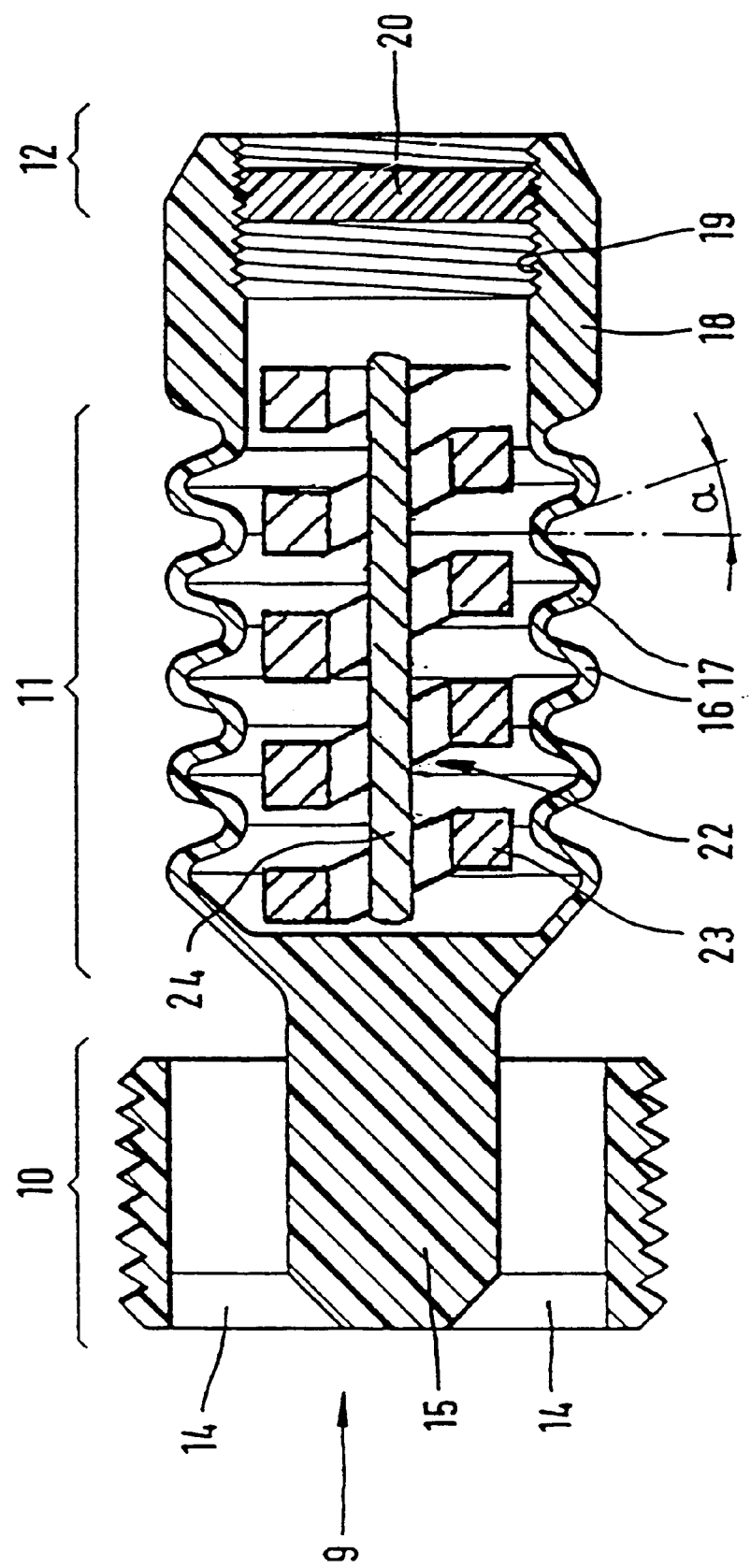
FIG. 3 shows a second embodiment of a valve insert in longitudinal section and in enlarged representation.

In the exemplary embodiment of FIG. 3, a coil spring is inserted into the cavity 21 as a further spring element 23 and this has a coiling direction opposite to the direction of screwing in of the valve seat 12. Coaxially to the coil spring 23 in the cavity 21 there is a distance pin 24 which rests loosely in the coil spring 23.

What is claimed is:

1. Hydraulic shut-off valve with a valve insert (9) which comprises a single valve spring (11), a holding element (10) and a valve seat (12), and the valve spring (11), the holding element (10) and the valve seat (12) are designed as a one-piece component, the valve spring (11) being designed as a body (22) which has a cavity (21), characterized in that the cavity (21) is closed in gas-tight fashion by means of a screw plug (20) or by means of a cover.

2. Hydraulic shut-off valve according to claim 1, characterized in that the valve spring (11) is formed by a bellows (16).

3. Hydraulic shut-off valve according to claim 4, characterized in that the bellows (16) has an undulating or zig-zag wall (17).

4. Hydraulic shut-off valve according to claim 1, characterized in that the valve insert (9) is produced by machining or by injection-moulding.

5. Hydraulic shut-off valve according to claim 1, characterized in that the valve seat (12) has an actuating nose for another valve insert on its side remote from the valve spring (11).

6. Hydraulic shut-off valve according to claim 1, characterized in that the valve insert (9) is composed of plastic, a fluoroplastic, PFA, PTFE, TFM or PEEK.

7. Hydraulic shut-off valve according to claim 1, characterized in that the spring characteristic of the spring element (11) is linear, degressive or progressive and/or has a kink.

8. Hydraulic shut-off valve according to claim 1, characterized in that a distance pin (24) is inserted into the cavity (21).

9. Hydraulic shut-off valve according to claim 8, characterized in that the distance pin (24) is connected to the valve insert (9).

10. A method of using the valve insert of a hydraulic shut-off valve according to claim 1 which comprises incorporating said valve insert in a coupling sleeve (5) and a coupling nipple (4) of a hose coupling (1).

11. A method of using the valve insert of a hydraulic shut-off valve according to claim 1 which comprises incorporating said valve insert in a pressure relief valve or non-return valve.

12. A method of using the valve insert of a hydraulic shut-off valve according to claim 1 which comprises incorporating a hydraulic shut-off valve with said valve insert in a hose coupling in a hose line carrying high-purity chemicals.

* * * * *